United States Patent [19]

Heinz et al.

[11] Patent Number: 5,339,202
[45] Date of Patent: Aug. 16, 1994

[54] METHOD AND APPARATUS FOR AMPLITUDE COMPENSATED WRITE EQUALIZATION

[75] Inventors: John E. Heinz, Plymouth; Michael E. Hamerly, Vadnais Heights; Richard W. Molstad, St. Paul; Theodore A. Schwarz, Woodbury; Robert J. Youngquist, White Bear Lake, all of Minn.

[73] Assignee: Minnesota Mining and Manufacturing Company, St. Paul, Minn.

[21] Appl. No.: 37,285

[22] Filed: Mar. 26, 1993

[51] Int. Cl.$^5$ .................... G11B 5/09; G11B 5/035
[52] U.S. Cl. ..................... 360/46; 360/45; 360/65
[58] Field of Search .............. 360/40, 41, 45, 46, 360/67, 65, 68, 48, 31, 66

[56] References Cited

U.S. PATENT DOCUMENTS

| | | | |
|---|---|---|---|
| 3,503,059 | 3/1970 | Ambrico | 340/174.1 |
| 4,202,017 | 5/1980 | Geffon et al. | 360/45 |
| 4,691,254 | 9/1987 | Cloke | 360/45 |
| 4,965,873 | 10/1990 | White | 360/40 X |
| 5,060,089 | 10/1991 | Cleveland | 360/46 X |
| 5,172,280 | 12/1992 | Quintus et al. | 360/31 |

OTHER PUBLICATIONS

R. C. Schneider, "Write Equalization for Generalized (d,k) Codes," *Trans. Mag.*, IBM Corporation, Nov. 1988.

R. C. Schneider, "Write equalization in high-linear-density magnetic recording," *IBM J. Res. Develop.*, vol. 29(6), pp. 563-568, Nov. 1985.

D. H. Veilard, "Compact Spectrum Recording, a New Binary Process Maximizing the Use of a Recording Channel," *IEEE Trans. Magn.*, vol. MAG-20(5), pp. 891-893, Sep. 1984.

Magnetic Recording Handbook, "Technology and Applications," Mee et al., McGraw-Hill Publishing Company, pp. 872-883 Feb. 1982.

*Primary Examiner*—Donald Hajec
*Assistant Examiner*—Thien Minh Le
*Attorney, Agent, or Firm*—Gary L. Griswold; Walter N. Kirn; William B. Barte

[57] ABSTRACT

An adjustable write-equalized recording circuit for recording data onto a magnetic tape. The circuit variably adjusts the amplitude of write-equalization pulses relative to the data waveform by an amount that can be either preset or determined during operation.

7 Claims, 5 Drawing Sheets

METHOD AND APPARATUS FOR AMPLITUDE COMPENSATED WRITE EQUALIZATION

BACKGROUND OF THE INVENTION

This invention relates to write equalization techniques in magnetic tape recording.

Magnetic tape drives store digital information as transitions of magnetic flux on the surface of a magnetic tape. These transitions are separated by varying lengths, the ratio between the maximum and minimum lengths varying according to the data storage standard being used. For example, the 1,7 run length limited standard, 1,7 RLL, calls for a minimum separation of one binary "0" between transitions (binary "1's") and a maximum separation of seven "0's" between transitions ("1's"). Thus, the number of clock cells between transitions using the 1,7 RLL standard varies between a minimum of two and a maximum of eight clock cells.

In reading data from a magnetic tape, a read head passes over the flux transitions. The flux transitions induce a signal in the read head. The amplitude of the signal induced in the read head varies substantially depending on the transition separation, with the signal amplitude of an eight cell separation being much greater than that of a two cell separation. It is desirable to lessen differences in the amplitude of the signals induced in the read head by the minimum and maximum separations. The process of such minimization is known as equalization.

Originally, all equalization was accomplished on the readback of the data. Accomplishing the entire equalization process during the readback made the readback process and hardware more complicated, and introduced a greater likelihood of errors during the readback operation. For that reason, write equalization has been developed to split the burden of equalization of the data separations between write and readback operations.

A magnetic recording device writes data on a magnetic tape by passing a current through the write head. The write head creates a magnetic field which induces a magnetic alignment on the surface of the recording medium.

The data pattern that is written on the magnetic tape can be understood by considering the write current waveform passed through the write head. When, for example, the 1,7 RLL data recording standard is used, the direction of the write current flowing through the write head changes every time a binary "1" is to be written on the tape. For example, a binary "1" bracketed by binary "0's" will be written by a change in the direction of the write current in the write head at the binary "1" preceded and followed by periods in which the write current flows in opposite directions. Data is read back from a magnetic tape by signals induced from magnetized areas of the tape passing beneath the read head. The amplitude of the signal induced in the read head varies with the length of a region in which no transition occurs, such as a string of consecutive "0's". Long strings of binary "0's" will thus induce a readback signal having a progressively larger amplitude. Short strings of binary "0's" will similarly induce a readback signal having smaller amplitude. This variation in readback signal amplitude is undesirable.

Write equalization has been previously achieved by inserting write equalization pulses, each consisting of a pair of alternating transitions in the write current between changes in current direction that represent data. A write equalization pulse is a short-duration change in the direction of the write current, and is used to "cut a slice" out of the area bounded by the write current waveform.

While write equalization has been beneficial, it has not been fully effective in equalizing the amplitude of readback signals. Moreover, due to frequency response limitations in the write electronics and the write head, the amount of equalization achieved by a fixed write equalization pulse will vary. It is desirable, therefore, to vary the characteristics of the write equalization pulses to be able to compensate for changes in system requirements. One previously proposed approach for improving write equalization involves varying the pulse width of the write equalization pulses. That approach, however, can create phase distortions in the readback signal.

SUMMARY OF THE INVENTION

In the present invention, the amplitude of write equalization pulses is different from that of the write current levels used to write data. This achieves a greater or lesser degree of equalization in the readback current without increasing phase distortions or other undesirable effects. Accordingly, one aspect of the present invention is directed to an amplitude adjusted write equalized recording circuit for recording data onto a magnetic tape. This circuit comprises a write head, a source of current representative of data to be written onto the tape, and a controller for introducing equalization pulses into the circuit. The write head receives a flow of current and converts the flow of current into a magnetic field having a polarity which is a function of direction of current flow. The controller in turn regulates the current flow through the write head while introducing write equalization pulses into the current. The write equalization pulses have amplitudes different from the amplitudes of the current representative of data to be written. Preferably the controller responds to a data stream by generating at least one switch control signal based on the data stream and responds to that switch control signal to control the flow of current through the write head. To form the equalization pulses, the controller preferably includes a bridge circuit for selectively connecting the write current source and an equalization current source to the write head to produce data transitions and equalization pulses between the data transitions. In such an embodiment, the data transitions may be represented by current through the write head switching between first and second write current levels. In contrast, the equalization pulses are represented by current through the write head switching from the second write current level to the first equalization current level and back to the second write current level and by current through the write head switching from the first write current level to a second equalization current level and back to the first write current level.

DETAILED DESCRIPTION OF THE PREFERRED EMBODIMENTS

Figure 1:
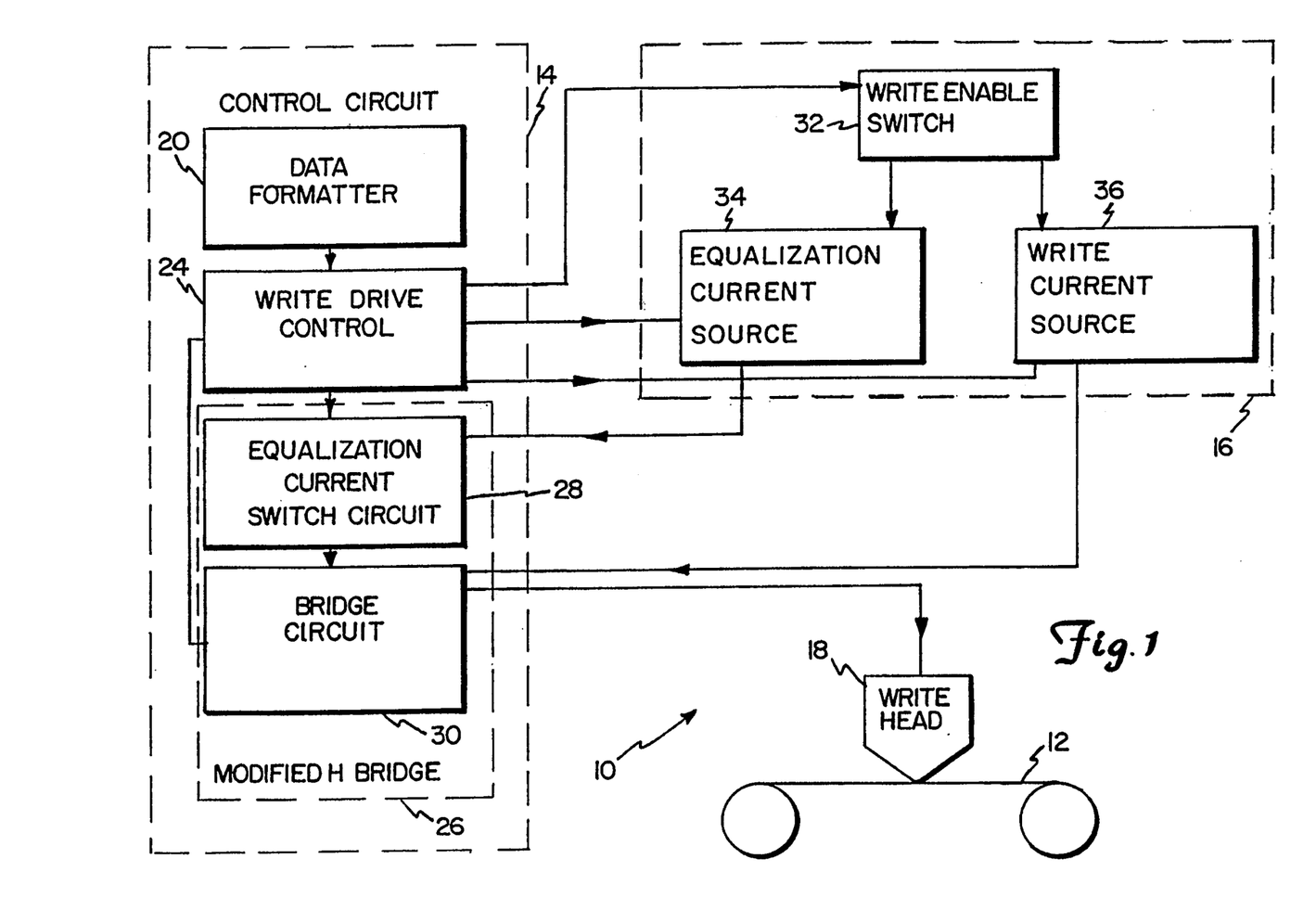
FIG. 1 is an overall block diagram of a recording circuit according to the present invention.

FIG. 1 shows a general block diagram of an amplitude adjusted write equalized recording circuit 10 for recording an amplitude-adjusted write-equalized waveform on magnetic tape 12 according to the present invention. Recording circuit 10 includes control circuit 14, current source 16, and write head 18.

Control circuit 14 includes data formatter 20, write drive control 24, and modified H bridge 26. Modified H bridge 26 includes equalization current switch circuit 28 and bridge circuit 30. Current source 16 includes write enable switch 32, equalization current source 34, and write current source 36. Data formatter 20 is connected to write drive control 24. Write drive control 24 is in turn connected to equalization current switch circuit 28, write enable switch 32, and bridge circuit 30. Equalization current switch circuit 28 is connected to equalization current source 34, write drive control 24, and bridge circuit 30. Bridge circuit 30 is connected to write drive control 24, equalization current switch circuit 28, and write current source 36. Write enable switch 32 is connected to write drive control 24, equalization current source 34, and write current source 36. Equalization current source 34 is connected to write enable switch 32, write drive control 24, and equalization current switch circuit 28. Write current source 36 is connected to write drive control 24, bridge circuit 30, and write enable switch 32. Data formatter 20 receives a raw waveform containing data and formats the data to provide the necessary signals to write drive control 24 to produce an amplitude adjusted write equalized waveform to be written by write head 18 on tape 12. Write drive control 24 supplies commands to write enable switch 32 to enable or disable the data writing function. Write drive control 24 also provides programming signals to adjust the current levels supplied by equalization current source 34 and write current source 36. Write drive control 24 also controls equalization current switch circuit 28 and bridge circuit 30 to produce an amplitude adjusted write equalized current waveform through write head 18. Equalization current switch circuit 28 and bridge circuit 30, under the control of write drive control 24, provide appropriate switching for current flowing from equalization current source 34 and write current source 36.

As mentioned above, write enable switch 32, equalization current source 34, and write current source 36, under the control of write drive control 24 provide appropriate currents for supplying an amplitude adjusted write equalized current waveform through write head 18.

Before describing in detail the circuit of the present invention, it may be helpful to the understanding of the present invention to compare several data patterns as formatted by prior art techniques with that resulting from the present invention.

FIGS. 2A–2F thus illustrate data encoded according to the 1,7 RLL data standard according to prior art unequalized and write-equalized methods, as well as two embodiments of the same data encoded with amplitude adjusted write-equalization according to the present invention.

Figure 2A:
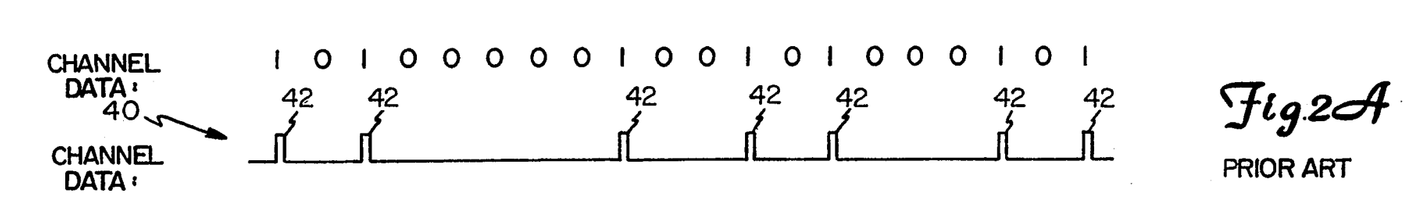
FIG. 2A is a representation of the data to be encoded on a section of magnetic tape according to one recording format of the prior art, the 1,7 RLL data standard.
Figure 2B:
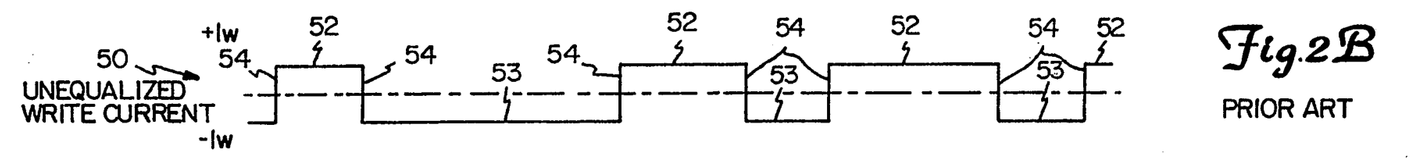
FIG. 2B is a representation of the write current encoded with the data of FIG. 1A.
Figure 2C:
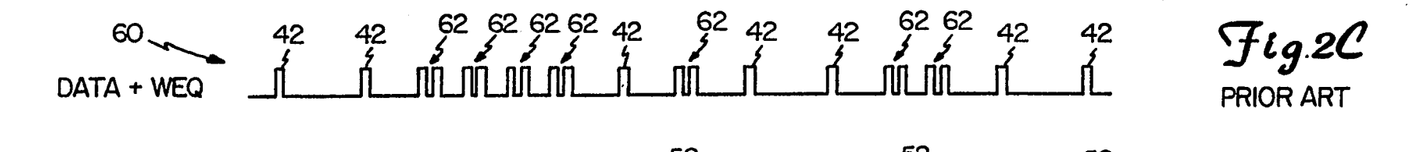
FIG. 2C is a representation of the data of FIG. 1A in which write-equalization pulses are introduced according to one technique of the prior art.
Figure 2D:
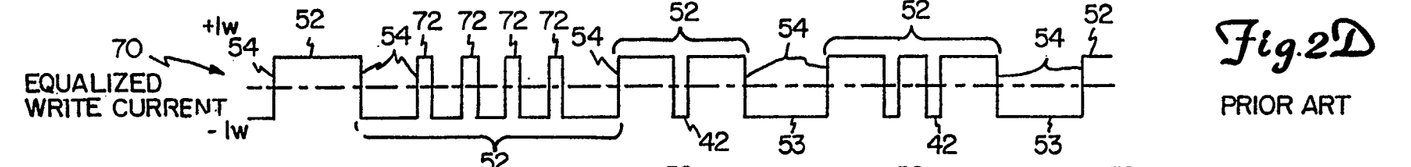
FIG. 2D is a representation of the write current of FIG. 2B further modified to include the data of FIG. 2C.
Figures 2E, 2F:
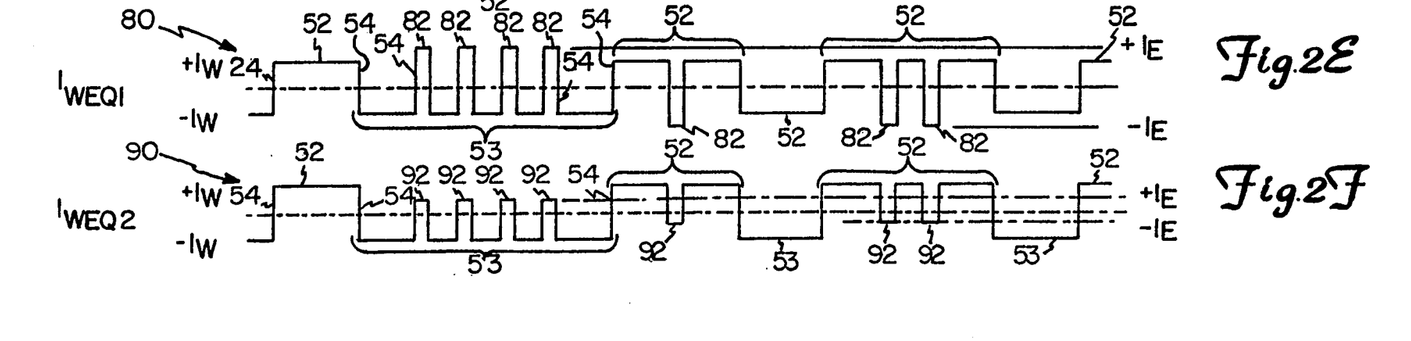
FIG. 2E is a representation of the write current of FIG. 2B encoded with equalization pulses according to one embodiment of the present invention, and the data of FIG. 2C, with amplitude adjustment having been performed on the write-equalization pulses, the write equalization pulses having been adjusted to have a greater amplitude than the data.
FIG. 2F is a representation of the write current of FIG. 2B encoded with equalization pulses according to another embodiment of the present invention.

FIG. 2A is a representative channel data stream ("CHANNEL DATA") 40 which has been encoded using the 1,7 RLL data recording standard on a magnetic tape. FIG. 2B is an example of an unequalized write current waveform ("D") 50 produced according to techniques of the prior art, to encode the data stream of FIG. 2A. FIGS. 2C and 2D are examples of the same data stream with write equalization added ("DATA+WEQ") 60, and a non-amplitude adjusted write-equalized write current waveform ("D+W") 70, respectively, according to techniques of the prior art. By contrast, FIGS. 2E and 2F are examples of two alternative amplitude-adjusted write-equalized current waveforms ("$I_{WEQ1}$" and "$I_{WEQ2}$") 80 and 90 produced by the recording circuit 10 of the present invention, to encode the data of FIG. 2A.

FIG. 2A is a representation of a typical data stream 40 to be recorded on a section of magnetic tape 12 (shown in FIG. 1). Each "1" in a unit cell of data stream 10 is represented by a pulse 42, the leading edge of which signals a change in the direction of flow of current through a write head.

FIG. 2B is a digital representation of unequalized write current waveform 50 which may be used to write the data stream 40, represented by FIG. 2A on a magnetic tape. Regions 52 correspond to the regions between pulses 42 in the data stream in which a "0" or consecutive "0's" occur between "1's." A "1" is thus represented by a conveyed change of direction of current in the unit cell, and a "0" by the absence of a change in direction current. Data is not conveyed by the actual direction of the current flow, or by any other characteristics such as amplitude. It is therefore convenient to consider the current as a digital waveform, with current transitions 54 between current levels $+I_W$ and $-I_W$ occurring each time a pulse 42 occurs in data stream 40. Because the only data conveyed by data stream 40 is in the form of pulses 42 representing binary "1's," current transitions 54 occur only when a "1" occurs in data stream 40. Thus, as in the case of a long string of 0's in data stream 40, there may be extended periods during which no current transitions 54 occur.

Positive current level ($+I_W$) regions 52 and negative current level ($-I_W$) regions 53 lie between transitions 54 in write current waveform 50. The positive current level ($+I_W$) regions alternate with the negative current level ($-I_W$) regions. Whether a region is positive or negative has no significance. All stable regions 52 and 53 represent a string of binary "0's," with the number of consecutive "0's" varying with the duration of the respective region. Each region 52 and 53 ends when the next binary "1" appears in data stream 40. At that point, another current transition 54 occurs. The current transition 54 marks the beginning of another region 52 and 53 of binary "0's" which ends with the next current transition 54. Thus, a transition 54 represents a "1" in data stream 40, while the duration of each region represents the number of consecutive "0's" in data stream 40.

The readback signal induced by reading a magnetic tape encoded using current waveform 50 is not a pure digital waveform, but instead varies in amplitude with the period between transitions 54. In order to reduce the variation in amplitude of the readback current induced in the read head, it has become common in the prior art to introduce write-equalization pulses into data stream 40. FIG. 2C shows data stream 60, with data pulses 42 being the same as those in data stream 40 of FIG. 2A. Data stream 60 differs from data stream 40 in that pairs of equalization pulses 62 have been introduced into data stream 60 to induce pulses during each unit cell in which no data transition 54 occurs.

FIG. 2D shows a digital representation of a write-equalized current waveform 70 of the prior art, used to write data stream 60, with write-equalization pulses 72 introduced between data transitions 54 at times defined by the pairs of equalization pulses 62. The greater the period between data transitions 54, the more write-equalization pulses 72 are introduced. The presence of the write-equalization pulses 72 reduces the low frequency amplitude of waveform 50 by effectively "cutting a slice" out of waveform 50.

By "cutting a slice" out of write current waveform 70, write equalization pulses 72 reduce amplitude variation in the signal induced in the read head during readback of the magnetic tape. As shown in FIG. 2D, write equalization pulses 72 have the same amplitude as that of regions 52 and 53; that is, between the $+I_W$ and $-I_W$ current levels.

However, write-equalization pulses 72 are narrow with respect to positive current level regions 52 and negative current level regions 53. Because of the relative narrowness of equalization pulses 72, along with the frequency limitations of the circuitry and the magnetic materials, pulses 72 have an effect that is not entirely predictable a priori. In order to achieve a desired equalization effect, it is necessary to increase the area bounded by equalization pulses 72. This can be done by altering the width of pulses 72. However, as noted above, this can create phase distortions in the readback signal. An alternative, one which creates no phase distortions, is to alter the amplitude of pulse 72. It is desirable, therefore, to vary the amplitude of write-equalization pulses 72 in order to accurately compensate for variations.

FIG. 2E shows a digital representation of an amplitude-adjusted, write-equalized current waveform 80 of one embodiment of the present invention. Waveform 80 is used to write the data stream 60 of FIG. 2C, with write-equalization pulses 82 introduced between data transitions 54 at each transition-free unit cell defined by equalization pulse pairs 62 of FIG. 2C. Waveform 80 shown in FIG. 2E is similar to waveform 70 shown in FIG. 2D, but differs in that write-equalization pulses 82 have an amplitude level ($+I_E$ or $-I_E$) greater than levels $+I_W$ and $-I_W$ of regions 52 and 53.

It is also desirable to compensate for variations in the recording environment and electronics. This can be done by adjusting the amplitudes of write equalization pulses 72 so that they are greater than or less than levels $+I_W$ and $-I_W$ of regions 52 and 53, as desired.

FIG. 2F is a representation of an amplitude adjusted write equalized current waveform 90 of an alternative embodiment of the present invention. Waveform 90 shown in FIG. 2F is similar to waveform 80 shown in FIG. 2E, but differs in that levels $+I_E$ and $-I_E$ of write-equalization pulses 92 are less than levels $+I_W$ and $-I_W$ of regions 52 and 53.

The ability of the present invention to produce write equalization pulses having amplitudes greater or less than those of the data transitions allows for compensation for variations in the recording equipment and environment.

Figure 3:
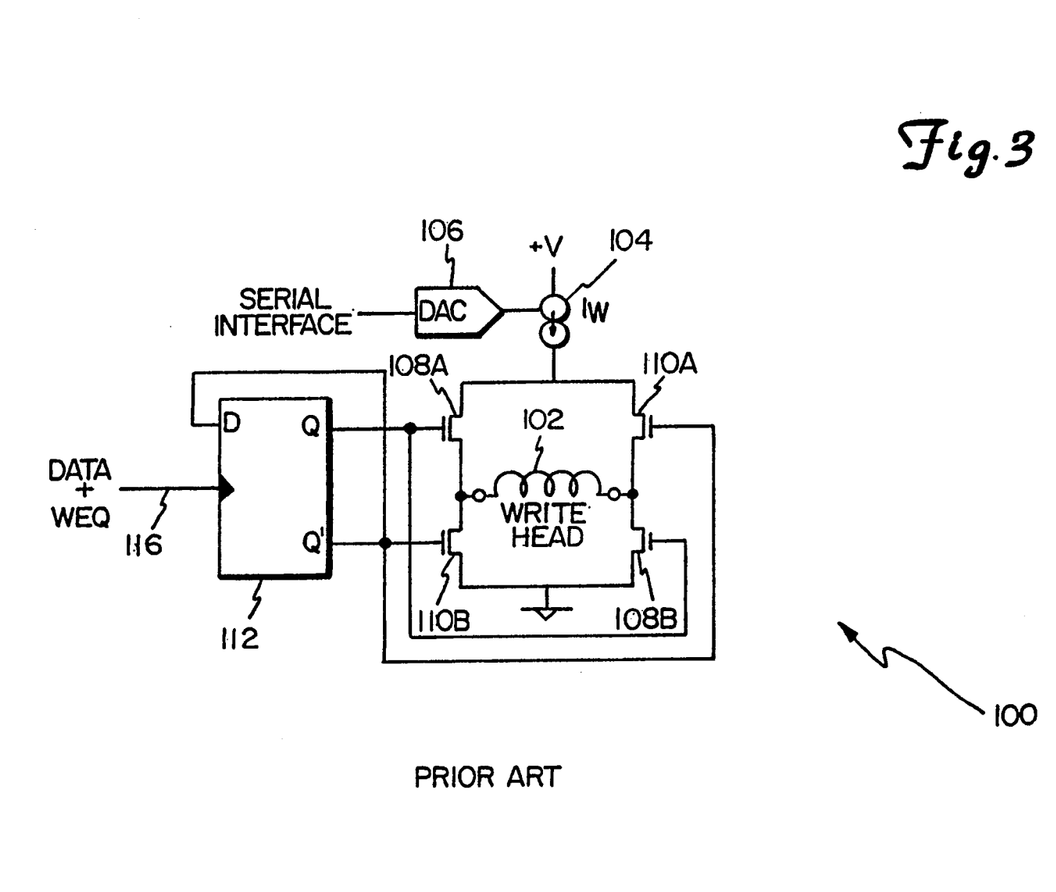
FIG. 3 is a current write driver of the prior art, capable of recording a write-equalized current waveform without amplitude adjustment.

FIG. 3 is a diagram of a current write driver circuit 100 of the prior art, which may be used to write data based upon either waveform 40 or 60. Driver circuit 100 includes a write head 102, a write current source 104, a digital-to-analog converter (DAC) 106, a first switch pair 108A and 108B, a second switch pair 110A and 110B, a flip-flop 112, and a serial interface bus 114. The switch pairs illustrated in this embodiment are preferably Field Effect Transistors, FET's, but the present invention is not so limited.

Write head 102 is connected to switches 108A, 108B, 110A, and 110B in an H bridge configuration. The flow of write current $I_W$ from current source 104 through write head 102 is regulated by first switch pair 108A and 108B and second switch pair 110A and 110B. The level of write current $I_W$ is set by DAC 106 based upon a digital command received over serial interface bus 114.

First switch pair 108A and 108B and second switch pair 110A and 110B are controlled by flip-flop 112. First switch pair 108A and 108B are connected to the "Q" output of flip-flop 112. Second switch pair 110A and 110B are connected to the "Q'" output of flip-flop 112. Thus, when first switch pair 108A and 108B are open, second switch pair 110A and 110B are closed, and vice-versa. Moreover, the output "Q" of flip-flop 112 is tied to the D input of flip-flop 112, so that flip-flop 112 changes state every time it clocks in response to a positive going edge of a pulse 42 or 62 changing the states of first switch pair 108A and 108B and second switch pair 110A and 110B.

To understand the operation of recording circuit 100 of the prior art, assume that data stream 60 shown in FIG. 2C is provided as the clock input to flip-flop 112. Every time a pulse 42 or 62 occurs in data stream 60, flip-flop 112 changes states, causing first switch pair 108A and 108B and second switch pair 110A and 110B to change states. For example, before the first pulse 42 of data stream 60 shown in FIG. 2C, assume that the Q output of flip-flop 112 is a "0". Consequently, first switch pair 108A and 108B are open and second switch pair 110A and 110B are closed causing write current $I_W$ to flow from write current source 104, through switch 110A, through write head 102, and through switch 110B to ground. This results in region 52 being at the $+I_W$ level. When the next pulse 42 occurs, flip-flop 112 changes state, opening switches 110A and 110B and closing switches 108A and 108B. Write current $I_W$ thus flows from current source 104, through switch 108A, through write head 102, through switch 108B, to ground. This results in the next region being at the $-I_W$ level. The same process occurs throughout data stream 60, with the direction of write current through write head 102 changing with each pulse 42 or 62.

Figure 4:
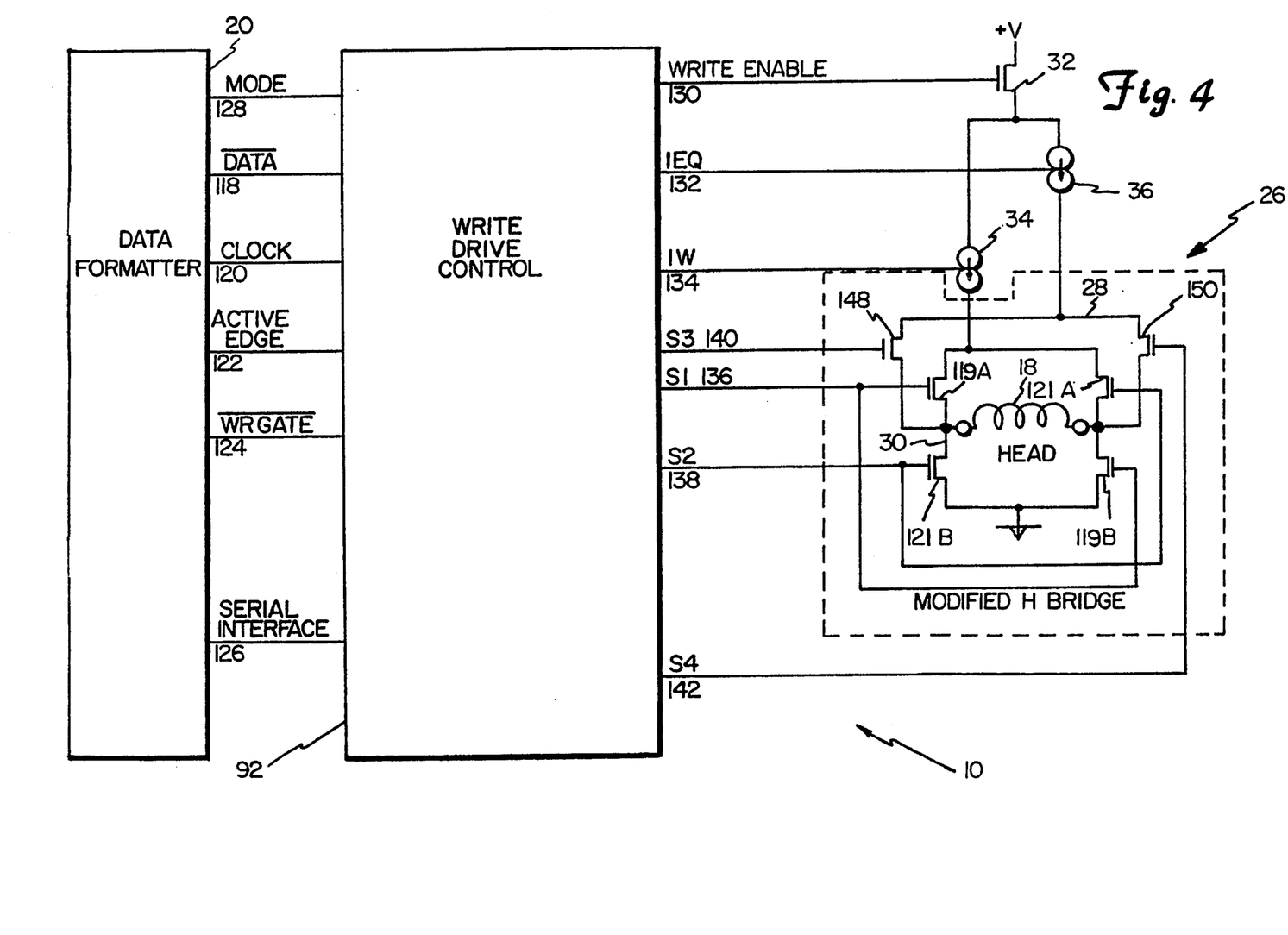
FIG. 4 is a diagram of the amplitude-adjusted write-equalized recording circuit of the present invention.

FIG. 4 shows an amplitude adjusted write equalized recording circuit 10 according to the present invention. As noted above, the recording circuit 10 includes, as a part of a control circuit 14, a data formatter 20, a write drive control circuit 24 and modified H-bridge 26. Write drive control circuit 24 receives as input from data formatter 20 signals INVERTED_DATA or ($\overline{DATA}$) 118, CLOCK 120, ACTIVE EDGE 122, INVERTED_WRGATE, or ($\overline{WR\_GATE}$) 124, SERIAL INTERFACE 126 and MODE 128. Write drive control circuit 24 supplies as output signals WRITE ENABLE 130, $I_{EQ}$ 132, $I_W$ 134, and S1-S4 (136-142). All the S1-S4 outputs of write drive control circuit 24 are supplied to modified H-bridge 26.

Modified H bridge 26 is connected to write head 18. Modified H bridge 26 includes equalization current switch circuit 28 and bridge circuit 30. Bridge circuit 30 includes a first switch pair 119A and 119B, and a second switch pair 121A and 121B. Equalization current switch circuit 28 includes a third switch 148 and a fourth switch 150. Write enable switch 32 is controlled by the WRITE-ENABLE output signal 130 from write drive control circuit 24. Equalization current source 36 is controlled by the $I_{EQ}$ signal 132 from write drive control circuit 24. Write current source 34 is controlled by the $I_W$ signal 134 from write drive control circuit 24. Switches 148 and 150 are controlled by signals S3 and S4, respectively, from write drive control circuit 24. First switch pair 119A and 119B and second switch pair 121A and 121B are controlled by signals S1 and S2, respectively, from write drive control circuit 24.

The serial interface input 126 provides digital commands which control the levels of current $I_W$ supplied by write current source 34 and current $I_{EQ}$ supplied by equalization current source 36. The INVERTED_WR_GATE signal 124 controls the WRITE ENABLE signal 130, which controls write enable switch 32. If write enable switch 32 is open, modified H bridge 26 is disconnected from voltage source V+ and cannot be used for writing data. The CLOCK signal 120 provides clocking to recording circuit 10. The INVERTED_DATA input 118 supplies the data to be written to a magnetic tape by H bridge 26.

First switch pair 119A and 119B are always in the same state. Second switch pair 121A and 121B are always in the same state, that state being opposite that of first switch pair 119A and 119B. First switch pair 119A and 119B and second switch pair 121A and 121B regulate the flow of write current $I_W$ from write current source 34 through write head 18. Third switch 148 and fourth switch 150 regulate the flow of equalization current $I_{EQ}$ from equalization current source 36 through write head 18. Third switch 148 and fourth switch 150 are always in opposite states.

Recording circuit 10 can be used to adjust the amplitude of write equalization pulses so that they are either greater than or less than the write data to be written on a magnetic tape. When it is desired to increase the amplitude of the write equalization pulses (as in FIG. 2E), signal S1 (136) follows a write equalized data waveform. Signal S3 (140) follows the same waveform, but inverted and with the write equalization pulses removed. Thus, if the current level to be written on the magnetic tape is low, signal S1 (136) is low, signal S2 (138) is high, first switch pair 119A and 119B are open, and second switch pair 121A and 121B are closed. Write current therefore flows from write current source 34 through switch 121A, through write head 18, and through switch 121B to ground. At the same time, signal S3 (140) is high and signal S4 (142) is low. Because switch 119B is open, however, equalization current does not flow through recording head 18. Instead, equalization current flows through switch 148, and through switch 121B to ground.

When a write equalization pulse occurs, signal S1 (136) and S2 (138) change state. Signals S3 (140) and S4 (142) do not change state. Therefore, switches 121B and 121A open and switches 129A and 129B close. Write current $I_W$ therefore flows from write current source 34, through switch 119A through write head 18, and through switch 119B to ground. Because switches 148 and 150 have not changed states, equalization current $I_{EQ}$ flows from equalization current source 36 through switch 148, through write head 18, and through switch 119B to ground. This increases the amount of current passing through recording head 18 during a write equalization pulse so that $I_E = I_W + I_{EQ}$. Switch changes continue to occur with every write equalization pulse and data transition with equalization current $I_{EQ}$ and write current $I_W$ flowing through recording head 18 in the same direction during write equalization pulses, and with equalization current $I_{EQ}$ flowing to ground otherwise.

When it is desired to reduce the amplitude of write equalization pulses (as in FIG. 2F), write current $I_W$ is reduced by an amount equal to equalization current $I_{EQ}$ so that $I_E = I_W - I_{EQ}$. The state of signal S1 continues to follow the write equalization waveform desired to be written. The state of signal S3 follows the same waveform, uninverted, with the write equalization pulses removed. Thus, if the data signal is low, first switch pair 119A and 119B are open and second switch pair 121A and 121B are closed. Write current flows from write current source 34, through switch 121A, through write head 18, and through switch 121B to ground. At the same time, switch 150 is closed and switch 148 is open. Thus, equalization current $I_{EQ}$ flows from equalization current source 36, through switch 150, through write head 18, and through switch 121B to ground. When a write equalization pulse occurs, the states of switches 148 and 150 remain the same, while the states of first switch pair 119A and 119B and second switch pair 121A and 121B change. Thus, write current flows from write current source 34, through switch 119A, through write head 18, and through switch 119B to ground. Equalization current $I_{EQ}$ no longer flows through write head 18 because switch 119B is closed. Equalization current $I_{EQ}$ flows from equalization current source 36, through switch 150, and through switch 119B to ground. The amplitude of the current flowing through write head 18 is therefore reduced by the amount of equalization current $I_{EQ}$ no longer flowing through recording head 18. Similar transitions continue to occur throughout the write cycle, with the states of switch 148 and first switch pair 119A and 119B opposite during a write equalization pulse and the same during the writing of data.

Figure 5:
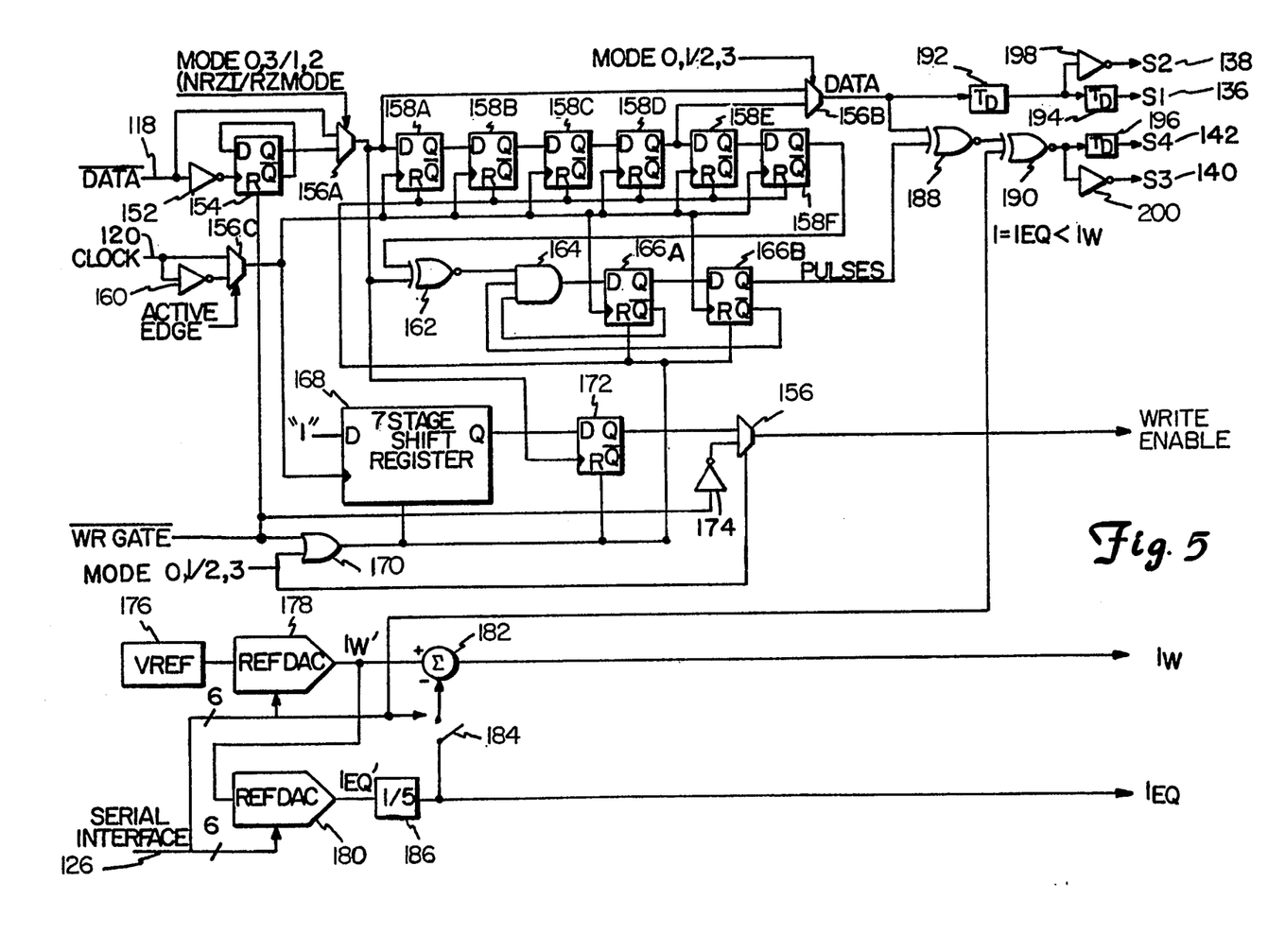
FIG. 5 is a schematic diagram of the write drive control of the recording circuit of FIG. 4.

FIG. 5 shows a preferred embodiment of write drive control circuit 24, which generates signals S1-S4 (136-142), $I_W$ (134), $I_{EQ}$ (132), and WRITE ENABLE 130 to control operation of modified H bridge 126 Write drive control circuit 24 includes an inverter 152, a flip-flop 154, mode selectors 156A-156D, a shift register 158 (formed by data flip-flops 158A-158F), an inverter 160, an exclusive-OR gate 162, an AND gate 164, flip-flops 166A and 166B, a shift register 168, an OR gate 170, a flip-flop 172, an inverter 174, a voltage reference 176, digital-to-analog converters (DAC) 178 and 180, a summing node 182, a switch 184, a multiplier 186, exclusive-OR gates 188 and 190, time delays 192, 194 and 196, and inverters 198 and 200.

INVERTED_DATA signal 118 is passed to mode selector 156A. Signal INVERTED_DATA 118 is also inverted by inverter 152 and supplied to the clock input of flip-flop 154. The output of flip-flop 154 is passed to mode selector 156A. Depending on signal MODE (128), mode selector 156A provides as its output either the Q output of flip-flop 154 or the INVERTED_DATA signal 118. If signal MODE (128) is 0 or 3, the current produced in write head 18 is edge-sensitive. If signal MODE (128) is 1 or 2, the current produced in write head 18 is level sensitive. The output of mode selector 156A is supplied to mode selector 156B, to shift register 158, to exclusive-OR gate 162 and to flip-flop 172. The output of mode selector 156A is clocked through flip-flops 158A-158F forming the shift register 158, with the output of flip-flop 158D being brought out and furnished to mode selector 156B.

Mode selector 156B selects either the output of flip-flop 158D or the output of mode selector 156A as signal DATA to Exclusive-OR gate 188 and time delay circuit 192. If the signal MODE (128) is 0 or 1, write equalization is automatically performed. If the level of signal DATA remains the same for more than a specified time, signal DATA will undergo a short temporary level shift, causing a short temporary reversal in the direction of current flowing through write head 18. If signal MODE (128) is 2 or 3, automatic write equalization is not performed. Signal DATA provided by mode selector 156B inversely follows the INVERTED_DATA signal 118.

The signal DATA is passed through time delay 192 and then split to supply time delay 194 and inverter 198. The output of time delay 194 is signal S1 (136), which controls switches 119A and 119B of FIG. 4. The output of inverter 198 is signal S2 (138), which controls switches 121A and 121B. The output of inverter 198 (signal S2) is opposite to the output of time delay 194 (signal S1). Thus, switches 119A and 119B will always be in an opposite state from switches 121A and 121B.

Flip-flops 158A-158F are clocked by the output of mode selector 156C, which receives the signal CLOCK (120), both directly, and passed through inverter 160. Depending on the state of signal ACTIVE EDGE (122), mode selector 156C supplies either the signal CLOCK (120) or INVERTED_CLOCK to the clock inputs of flip-flops 158A-158F, 166A and 166B.

The output of flip-flop 158F is furnished to one input of exclusive-OR gate 162. Exclusive-OR gate 162 combines the output of flip-flop 158F and the output of first mode selector 156A and furnishes its output to AND gate 164. The output of AND gate 164 is passed through flip-flops 166A and 166B. The output of flip-flop 166B is provided as signal EQ PULSES to exclusive-OR gate 188.

Exclusive-OR gate 188 receives as inputs signals DATA and EQ PULSES and provides its output to one input of exclusive-OR gate 190. Depending on whether the write-equalization pulses are to be augmented (FIG. 2E) or diminished (FIG. 2F), serial interface bus 126 supplies either a "0" or "1" to exclusive-OR gate 190.

If a "0" is supplied to exclusive-OR gate 190, the outputs of inverter 200 (signal S3 (140)) and time delay 196 (signal S4 (142)) will be opposite those of time delay 194 (signal S1 (136)) and inverter 198 (signal S2 (138)), respectively. If a "1" is supplied to exclusive-OR gate 190, the outputs of inverter 200 and time delay 196 will be the same as those of time delay 194 and inverter 198, respectively.

Signal WRITE ENABLE (which enables a write operation) is produced by shift register 168, OR gate 170, flip-flop 172, inverter 174 and mode selector 156D based upon input signals and signal MODE (128) and the clock signal from mode selector 156C. If signal MODE (128) is 2 OR 3, signal WRITE ENABLE is triggered by the logic level of WR_GATE 124. If signal MODE (128) is 0 or 1, signal WRITE ENABLE is triggered by the logic level of signal WR_GATE in conjunction with seven clock pulses at mode selector 156C and the output of mode selector 156A.

DAC 178 receives a reference voltage level from voltage reference 176. DAC 178 receives a program input signal from serial interface bus 126 and sets raw write current $I_W'$ according to those instructions. Raw write current $I_W'$ is supplied to DAC 180 as a reference and to summing node 182. DAC 180 receives a program input signal from serial interface bus 126 and sets current $I_{EQ}'$ according to the program input signal. Current $I_{EQ}'$ is passed through multiplier 186 to produce equalization current $I_{EQ}$. Depending on whether equalization current $I_{EQ}$ is to be used to augment or diminish the write equalization pulses, serial interface bus 126 directs switch 184 to be closed or open. If equalization current $I_{EQ}$ is to be used to augment the write equalization pulses (as in FIG. 2E), switch 184 is open, equalization current $I_{EQ}$ is not subtracted from raw write current $I_W'$, and write current $I_W$ is equal to raw write current $I_W'$. If equalization current $I_{EQ}$ is to be used to diminish the write equalization pulses (as shown in FIG. 2F), switch 184 is closed, equalization current $I_{EQ}$ is subtracted from raw write current $I_W$, and write current $I_W$ is equal to current $I_W' - I_{EQ}$. Write current $I_W$ (provided as the output of summing node 182) and equalization current $I_{EQ}$ (provided as the output of multiplier 186) control write current source 34 and equalization current source 36 of FIG. 4, respectively.

The present invention allows added control over the amplitude of the write equalization pulses, thereby avoiding any need to adjust the width of the pulses to correct for deficiencies in the previously known fixed amplitude equalization technique. This also thereby eliminates the phase distortion inherent in adjusting the timing of the pulses. Using the present invention, it is possible to adjust the amplitude of the write-equalization pulses to meet the requirements of the particular recording system, by changing a command to serial interface bus 126, which changes the outputs of DACs 178 and 180.

Although the present invention has been described with reference to preferred embodiments, workers skilled in the art will recognize that changes may be made in form and detail without departing from the spirit and scope of the invention.

What is claimed is:

1. An amplitude-adjusted write-equalized recording circuit for recording data onto a magnetic tape comprising:

write head means for receiving a flow of current and converting the flow of current into a magnetic field, having a polarity which is a function of the direction of current flow;

write current source means for furnishing to the write head a write current ($I_W$) representative of a data stream to be written onto the magnetic tape;

equalization current source means for furnishing to the write head equalization current ($I_{EQ}$) for adjusting the amplitude of write equalization pulses in the write-equalized data stream, the write current source means and equalization current source means together furnishing to the write head current representative of data to be written onto the magnetic tape;

control means for regulating current flow from the write and equalization current source means through the write head, the control means introducing write-equalization pulses from the equalization current source into the current going to the write head having amplitudes different from amplitudes of the write current representative of data to be written, the control means including:

means for receiving a data stream;

means for converting the data stream into write current switching control signals and equalization current switching control signals;

first switching means responsive to the write current switch control signals for allowing write current ($I_W$) to flow in first and second directions in the write head as a function of the write current switch control signals; and second switching means responsive to the equalization current switch control signals for allowing equalization current ($I_{EQ}$) to flow through the write head in the same direction as the write current during a write equalization pulse and to ground during normal writing of the data.

2. The recording circuit of claim 1 wherein the control means includes means for controlling the write current source means in response to a program input signal to provide variable levels of write current.

3. The recording circuit of claim 2 wherein the control means includes means for controlling the equalization source means in response to the program input signal to provide variable levels of equalization current.

4. The recording circuit of claim 1, wherein the amplitude of the equalization pulses is less than the amplitude of the write current representative of data to be written.

5. The recording circuit of claim 1, wherein the amplitude of the equalization pulses is greater than the amplitude of the write current representative of data to be written.

6. The recording circuit of claim 1, wherein the control means is selectively switchable between a first state in which the amplitude of the equalization pulses is less than the amplitude of the write current representative of data to be written and a second state in which the amplitude of the equalization pulses is greater than the amplitude of the write current representative of data to be written.

7. A recording circuit for recording data onto a magnetic medium, the recording circuit comprising:

a write head;

a write current source;

an equalization current source;

a control system for receiving a data stream to be recorded onto the magnetic medium and generating write current switch control signals and equalization switch control signals based thereon;

a bridge circuit for selectively connecting the write current source and the equalization current source to the write head to produce data transitions and equalization pulses between the data transitions, the bridge circuit comprising:

a first set of switches responsive to the write current switch control signals for selectively connecting the write current source to the write head to allow a write current ($I_W$) to flow in first and second directions in the write head as a function of the write current switch control signals; and a second set of switches responsive to the equalization current switch control signals for selectively connecting the equalization current source to the write head or to ground to allow an equalization current ($I_{EQ}$) to flow through the write head in the same direction as the write current during a write equalization pulse and to ground during normal writing of the data.

* * * * *

UNITED STATES PATENT AND TRADEMARK OFFICE
CERTIFICATE OF CORRECTION

PATENT NO. : 5,339,202

DATED : August 16, 1994

INVENTOR(S) : Heinz et al.

It is certified that error appears in the above-indentified patent and that said Letters Patent is hereby corrected as shown below:

Col. 8, lines 11/12, "121B and 121A" should be --121A and 121B--.

Col. 8, line 12, "129A and 129B" should be --119A and 119B--.

Col. 10, line 19, should be --156C and transition at the output of mode selector 156A.--.

Signed and Sealed this

Fourth Day of April, 1995

Attest:

BRUCE LEHMAN

Attesting Officer     Commissioner of Patents and Trademarks